Jan. 11, 1949.                    B. G. COOPER                    2,458,564
                            CEMENT SLAB MOLDING MACHINE
Filed Jan. 4, 1947                                           6 Sheets-Sheet 1
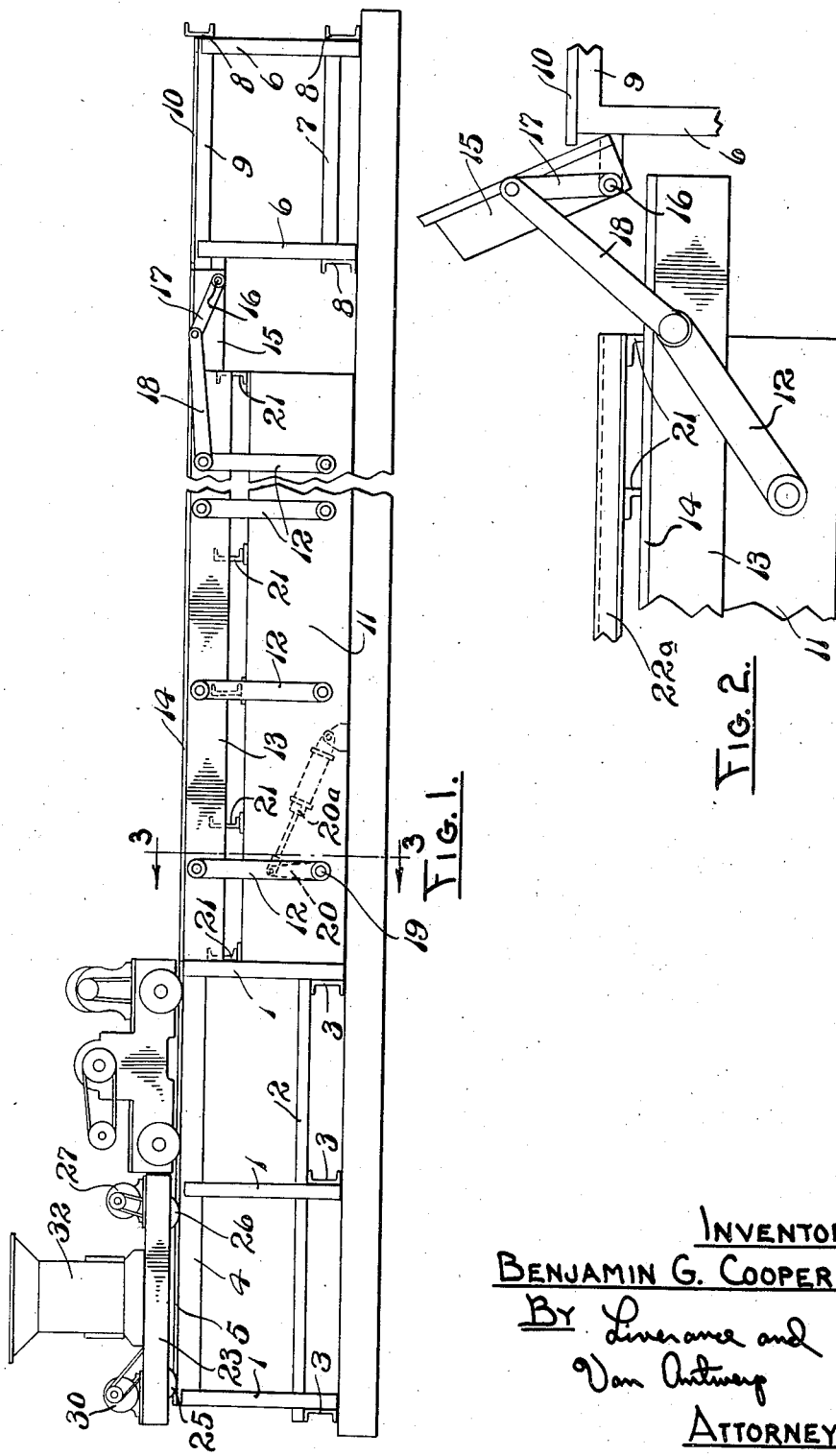
INVENTOR
BENJAMIN G. COOPER
BY Liverance and
Van Antwerp
ATTORNEYS INVENTOR
BENJAMIN G. COOPER
BY Liverance and
Van Antwerp
ATTORNEYS

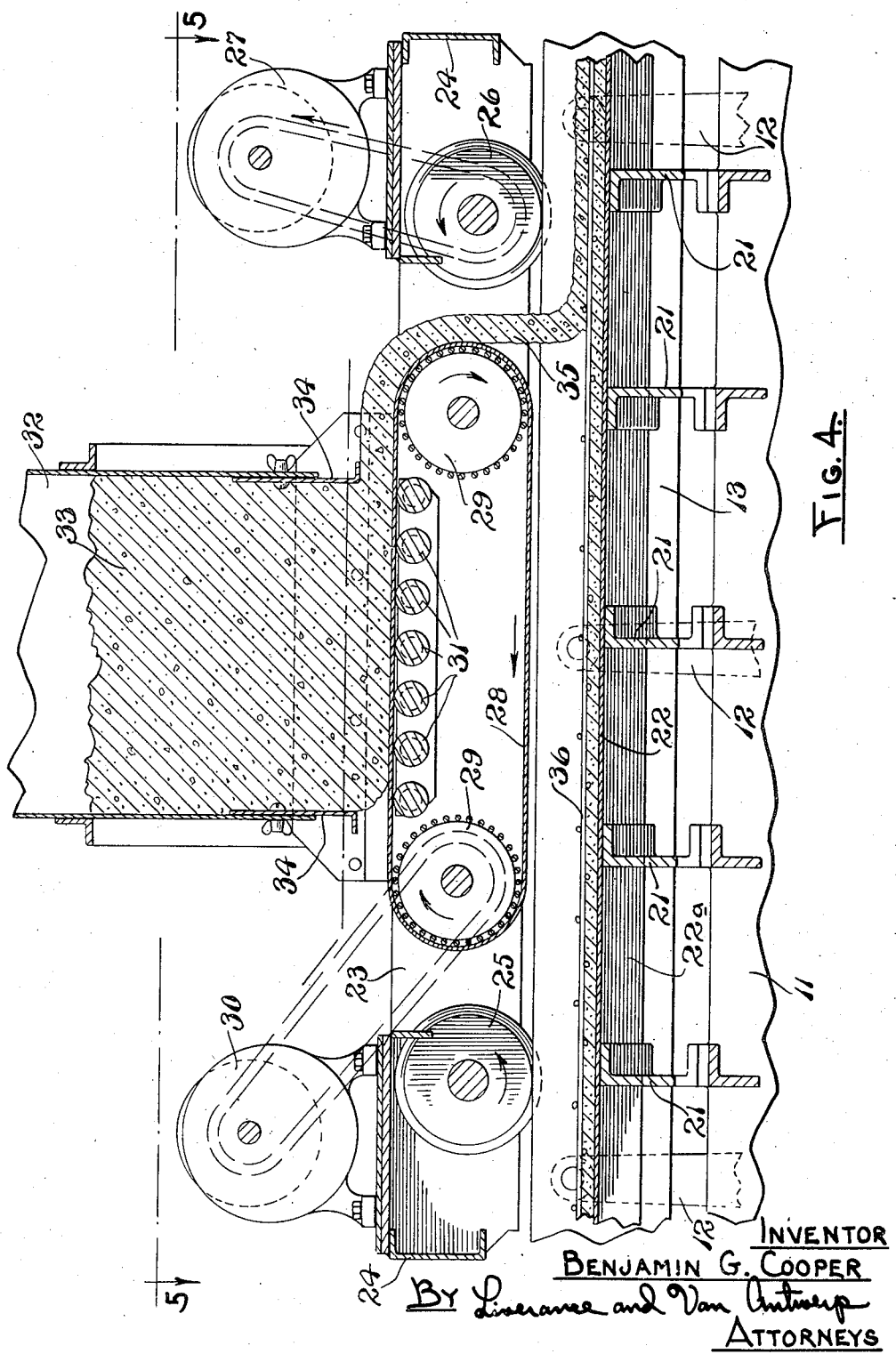

Jan. 11, 1949.  B. G. COOPER  2,458,564
CEMENT SLAB MOLDING MACHINE
Filed Jan. 4, 1947  6 Sheets-Sheet 4

INVENTOR
BENJAMIN G.
COOPER
By Liveranee
and
Van Antwerp
ATTORNEYS

Jan. 11, 1949.　　　B. G. COOPER　　　2,458,564
CEMENT SLAB MOLDING MACHINE
Filed Jan. 4, 1947　　　　　　　　6 Sheets-Sheet 5

INVENTOR
BENJAMIN G. COOPER
By Liverance and Van Antwerp
ATTORNEYS

Jan. 11, 1949.  B. G. COOPER  2,458,564
CEMENT SLAB MOLDING MACHINE
Filed Jan. 4, 1947  6 Sheets-Sheet 6
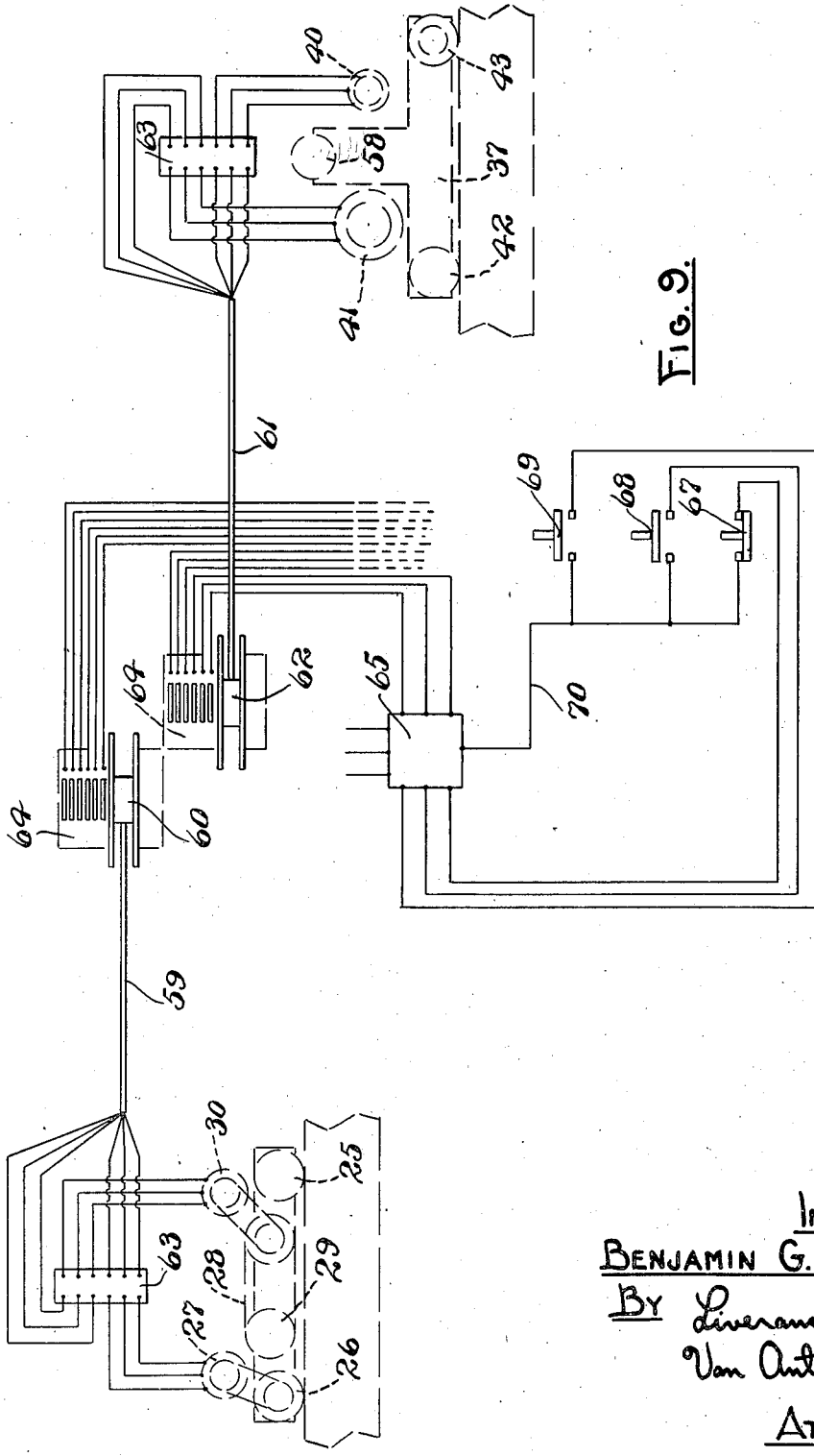
INVENTOR
BENJAMIN G. COOPER
BY Liverance and
Van Antwerp
ATTORNEYS Patented Jan. 11, 1949

2,458,564

UNITED STATES PATENT OFFICE 2,458,564

CEMENT SLAB MOLDING MACHINE

Benjamin G. Cooper, Holland, Mich., assignor to W. E. Dunn Manufacturing Company, Holland, Mich., a corporation of Michigan Application January 4, 1947, Serial No. 720,203

11 Claims. (Cl. 25—42)

1

This invention relates to a machine for the rapid and effective production of slabs, beams or the like, made from cementitious material.

In the handling of cementitious material and the forming and shaping of it into slabs or beams, not only must the material be held for shaping, but it must be compressed or tamped and properly smoothed or troweled. The production of the slabs or beams in forms of the proper dimensions, with the cementitious material shoveled into or otherwise put in the forms and the tamping or compressing and the smoothing or troweling, substantially all done by hand labor is well known, but such methods of producing the slabs, beams or the like are slow, cumbersome and expensive.

It is an object and purpose of the present invention to provide a machine in which very rapid quantity production of the desired slabs, beams and similar articles made from cementitious material may be done. In the machine embodying my invention, it is an object and purpose thereof to deposit the cementitious material continuously from a traveling hopper moving over the form, said material having a uniform flow from the hopper, thereby controlling the quantity used, and to move said hopper back and forth over the form, depositing a lower layer or stratum of the material in one movement and a second and upper layer or stratum on the return movement, it being designed in conjunction with the present machine that the cementitious slabs, beams or other similar products, may be of a reinforced character, such reinforcements being laid over the first deposited layer and covered by the second to be substantially midway between the opposed sides of the cementitious beam or slab produced.

Further, in conjunction with the present invention, it is an object and purpose thereof to efficiently and expeditiously compress and tamp the material laid, following immediately after the depositing or laying of the second stratum thereof, and simultaneously smooth and trowel the upper exposed side of the cementitious slab, beam or the like, so that when a completed movement back and forth of the material depositing and the tamping and troweling machines have been made, the slab or beam is complete and, with the underpallet which supports it and over which it has been made, removed from the machine for subsequent setting.

An understanding of the invention may be had from the following description, taken in connection with the accompanying drawings in which:

Fig. 1 is a side elevation of the complete mechanism of my invention.

2

Fig. 2 is a fragmentary, somewhat enlarged elevation showing the side members of the material receiving form at lower position, which position they occupy when a completed slab or beam is to be removed.

Fig. 4 is a fragmentary enlarged longitudinal vertical section through the material carrying and depositing machine, illustrating its manner of operation.

Fig. 9 is a diagrammatic layout of the wiring circuits and controls for the several mechanisms embodying the invention.

Like reference characters refer to like parts in the different figures of the drawings, and the sectional views are taken looking in the directions indicated by the arrows.

Figure 3:
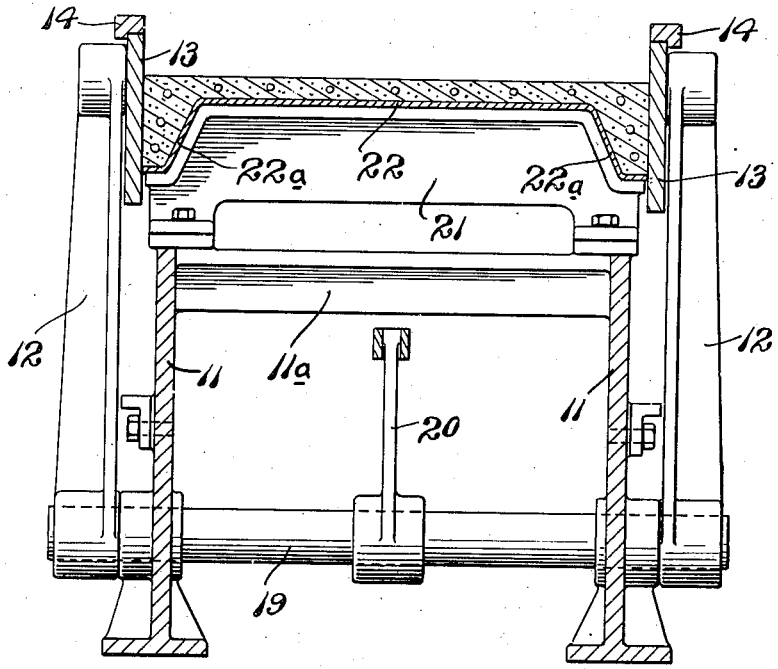
Fig. 3 is a transverse vertical section on the plane of line 3—3 of Fig. 1.

As shown in Fig. 1, a supporting structure is provided, including spaced vertical posts 1 connected by horizontal arms 2 and transverse cross bars 3, two series of said posts being provided, spaced from each other and each series at their upper ends carrying side bars 4, at the upper edges of which tracks 5 are permanently secured. This supporting structure is beyond one end of a cementitious material receiving form and is of a length such that the material supplying machine and the tamping and troweling machine may be carried thereabove on the tracks 5 beyond the adjacent end of the material receiving form which, as later described, includes a removable bottom or pallet which is to be removed after a beam or slab, or the like, has been formed thereon and set aside for hardening, with such removal without interference from the material depositing or tamping and troweling machines, being readily performed with them out of the way in the position shown in Fig. 1.

At the other end of the material receiving form is a second supporting structure with vertical posts 6, horizontal longitudinal and transverse frame bars 7 and 8, upper longitudinal side bars 9 and tracks 10 thereon, like the tracks 5, and which are located in the same horizontal plane therewith. Such supporting structure is of less length than the first one described as it is required to carry and support only the tamping and troweling mechanism during the operation.

The intermediate space or distance between the two spaced supporting structures described, is occupied by the cementitious material form and its supporting structure and mechanism. Two spaced vertical side plates 11, which have one end reaching to the innermost posts 1 of the first supporting structure, the opposite end being spaced a distance from the inner posts 6 of the second described supporting structure (Fig. 1) as shown in Fig. 3, are connected at their upper edges by horizontal transverse bars 11a. The lower ends of the posts 1 and 6 and the said sides 11 at their lower edges are connected to a common base shown in Fig. 1 (not numbered) and are in fixed positions relative to each other. At the outer sides of said vertical plates 11, spaced arms 12 are located which, at their lower ends, are pivotally mounted to turn about horizontal axes. At their upper ends they are connected to form side members 13, which members 13 have the same length as the side plates 11. Each of said form side members 13, at its upper edge has a track 14 which, when said members 13 are in their upper position (Fig. 1), at one end are in substantially abutting engagement with the adjacent ends of the tracks 5.

A bridge 15 which has spaced depending sides connected together and each with tracks, like tracks 14 and 10, at their upper edges, is pivotally mounted at 16 (Fig. 2) on arms extending from the inner posts 6. In its lower position (Fig. 1) it makes a bridge between the adjacent ends of the form sides 13 and the tracks 14 carried thereby, and the tracks 10 at the upper edges of the bars 9. Therefore in the position of the machine in Fig. 1, all of the tracks 5, 14 and 10, with the tracks at the upper edges of the sides of the bridge 15, are in direct longitudinal alinement.

The bridge 15 is turnable upwardly to the position shown in Fig. 2 simultaneously with a lowering of the form sides 13. Toggle links 17 and 18 connected together at their adjacent ends and at their opposite ends connected respectively to the bridge 15 and the form side members 13 operate on lowering side members 13 to lift the bridge out of the way. What may be termed the frontmost arms 12, at their lower ends are fixed to a horizontal rock shaft 19 mounted on and extending through bearings formed with the side plates 11 (Fig. 3). The rock shaft, through a center arm 20 connected therewith, and a piston cylinder structure, shown in dotted lines, Fig. 1, may be rocked to swing said arms 12 from vertical position as shown in Fig. 1 in a clockwise direction, whereupon the parallel link structure described and the form side members 13 move downwardly and in the direction of their length to the lower position shown in Fig. 2.

When in their upper position (Fig. 3), the side members 13 provide retaining sides of a form which is laid over spaced supporting sills 21 above and connected at their ends to the spaced side plates 11. The bottom of the cementitious material receiving form is provided with a sheet metal pallet 22 laid upon the spaced cross sills 21 and which may be readily removed and replaced by another. The side members 13 which complete the form, at their sides are free from connection to the bottom pallet 22. The shape of the pallet corresponds to the shape of the cross sills 21 and may be of various shapes; but in the disclosure made, at its longitudinal edge portions is pressed downwardly and outwardly as at 22a, and terminates in a short longitudinal horizontal flange at each edge, thus providing a form in which a beam of cementitious material of channel form may be made, as shown in Fig. 3.

Upon the continuous tracks which are made by sections 5, 14 and 10 and those at the upper sides of the bridge 15, the material depositing machine mechanism and the tamping and troweling machine are mounted for movement. In the construction of the cementitious material depositing mechanism, a rectangular frame is provided for spaced sides 23, connected by cross frame members 24 at the ends thereof. Wheels 25 on an axle adjacent one end of the frame, and like wheels 26 on an axle adjacent the other end of the frame, ride upon the tracks, so that the frame and the material carrying hopper thereon may be moved back and forth on said tracks. The axle which carries the wheels 26, for example, is driven by reversible electrical motor 27 (Fig. 4).

At the intermediate portion of and within the frame an endless belt 28 is mounted passing around two spaced horizontal rollers 29, said rollers being on suitable horizontal shafts, one of which is driven by an electric motor 30 on the frame through suitable belt connections. The upper run of the belt 28 passes over idle relatively closely spaced supporting rollers 31 (Fig. 2) directly below the open lower end of a hopper 32. Said hopper is also open at its upper end, is carried by the described frame, and receives the cementitious material designated at 33 which, by gravity, comes against the upper run of the belt 28 above the idle carrying rollers 31. The rollers 29 and the belt 28 being driven in the direction indicated, the semi-fluid cementitious material is delivered at a side of the hopper having an outlet opening, the width of which is adjustably controlled by a vertically adjustable gate 34 connected with the adjacent side of the hopper, as shown in Fig. 4. Therefore, a continuous ribbon 35 of a predetermined width and thickness is delivered to and drops by gravity until stopped by the pallet 22.

As previously mentioned, and as will hereinafter be more fully described, such material delivering mechanism will move in its first movement from the position shown in Fig. 1, over the several track sections until the end of the pallet has been reached. Ahead of the material delivering mechanism, the tamping and troweling mechanism will move onto the tracks 10. A deposit of the first layer or stratum of the cementitious material is thus obtained. Preferably, reinforcement for the beam or slab which is being made, in the form of small metallic rods or wires positioned lengthwise and crosswise thereof, indicated at 36, is placed over the first layer or stratum of material, and a return of the material depositing and the tamping and troweling mechanisms results in deposit of a second layer or stratum of the cementitious material above the reinforcement. At the end of said return movement, said material depositing and tamping and troweling machines are as in Fig. 1, above the first described supporting structure, with their wheels on the track sections 5, and beyond the adjacent end of the beam or slab which has been completed on such return movement of the described mechanisms.

The tamping and troweling machine includes a carriage having a frame with spaced sides 37 connected at their ends by cross frame members 38. Horizontal platforms 39, upon which electric motors 40 and 41 are mounted, are positioned at opposite ends portions of and above the frame. Idle wheels 42 on a horizontal shaft to traverse the several track sections mentioned are mounted adjacent one end of the carriage frame and like driven wheels 43 on a shaft are adjacent the opposite end, the wheels 43 being belt driven by the motor 40.

Figure 8:
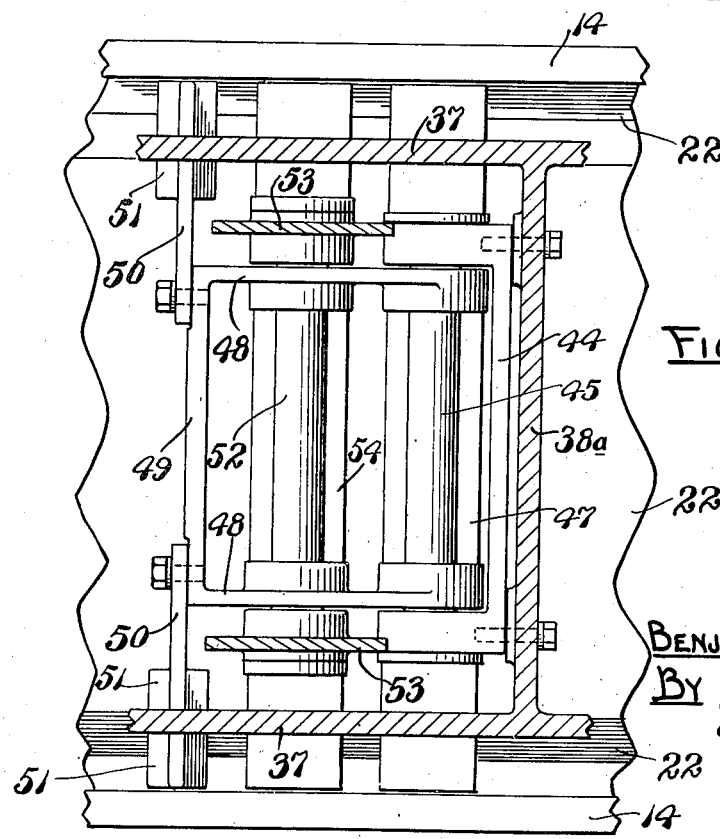
Fig. 8 is a fragmentary horizontal section on the plane of line 8—8 of Fig. 6.
Figure 5:
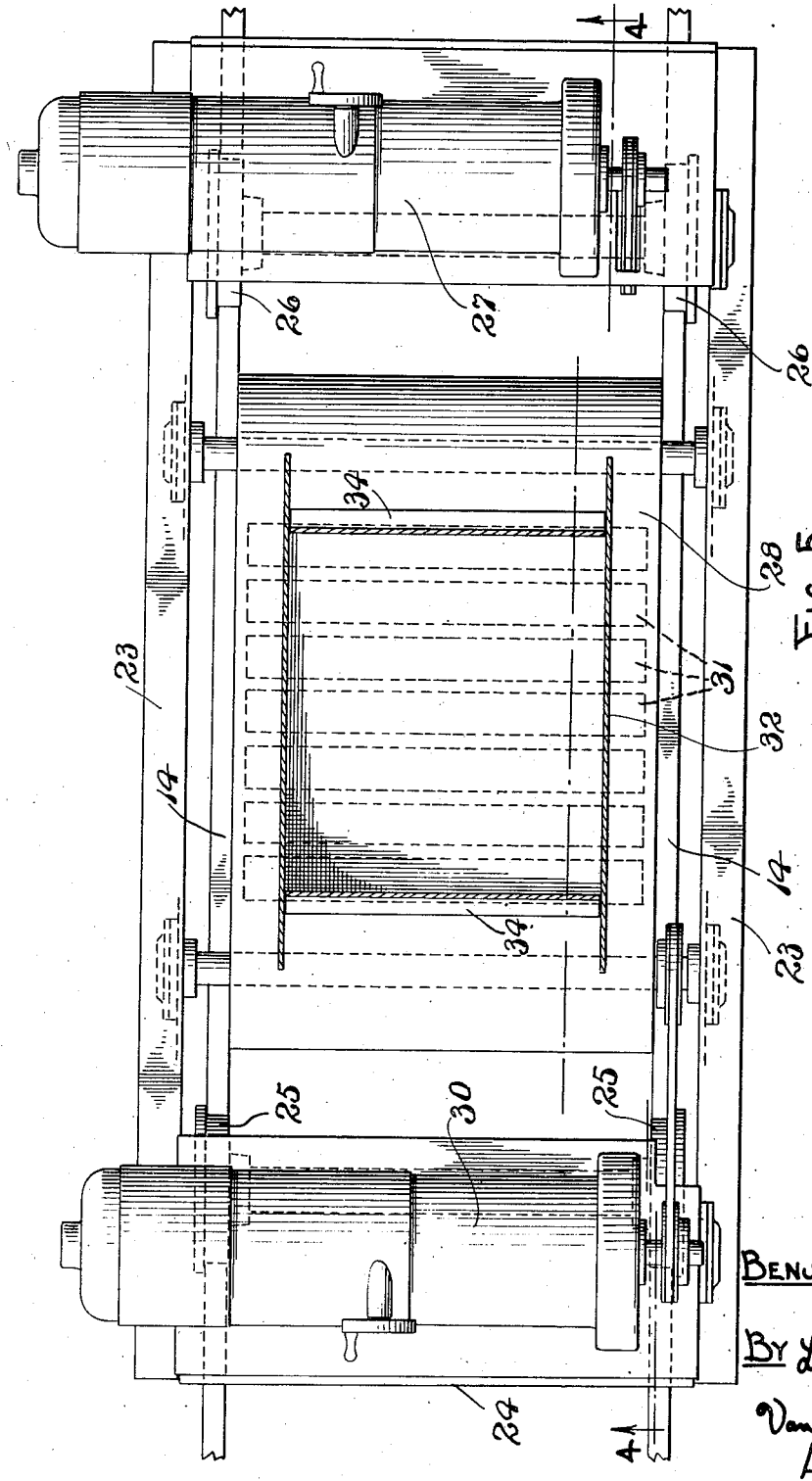
Fig. 5 is a plan and horizontal section substantially on the plane of line 5—5 of Fig. 4.

The carriage frame also includes a transverse vertical cross member 38a (Figs. 6 and 8) between the sides 37 to which a bracket 44 is permanently connected having spaced ears at its ends. A horizontal shaft 45 extends between and is mounted for rocking movement on said ears.

Figure 6:
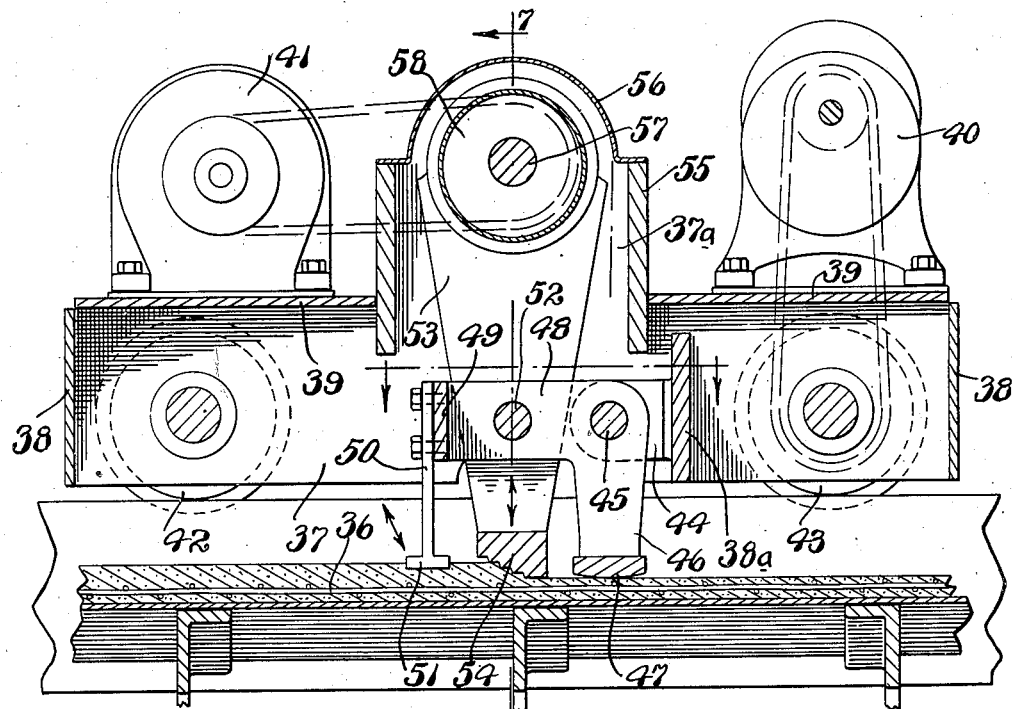
Fig. 6 is a longitudinal sectional view through the tamping and troweling machine, the plane of the section being at the line 6—6 of Fig. 7.
Figure 7:
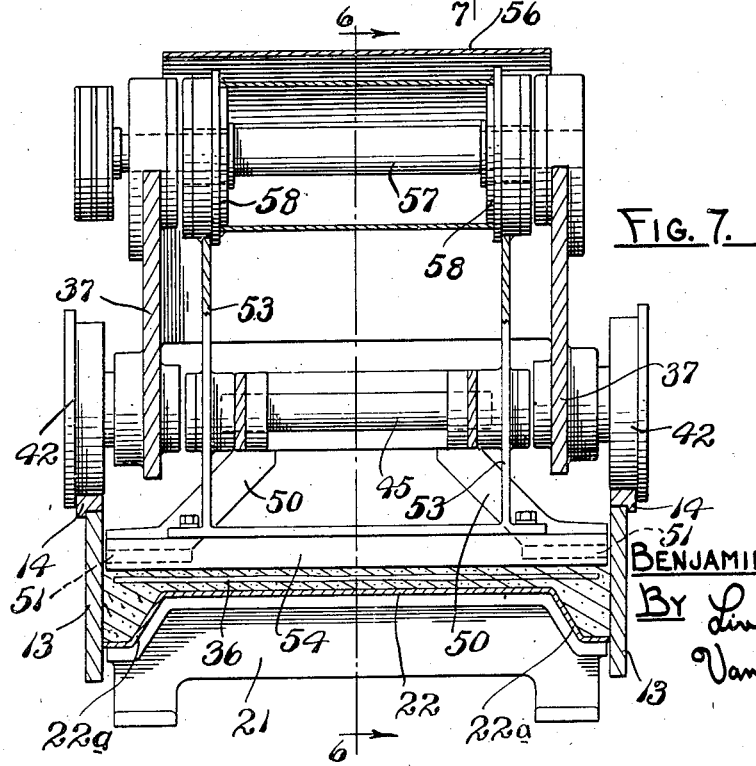
Fig. 7 is a transverse vertical section on the plane of line 7—7 of Fig. 6.

On the shaft 45 the troweling member of the machine is mounted for rocking movements. It includes two sides of bell-crank form, each having an arm 46 extending downwardly connected at their lower ends by a bar 47, having a convex under surface, as shown in Fig. 6. The sides or ends of the frame further include horizontal arms 48 extending from the shaft 45 and at their outer ends integrally connected by a bar 49. Adjacent each end of the bar a compressing or tamping element is secured, each compressing a vertical portion 50 at the lower end of which is a horizontal foot 51. Such foot portions 51 (Fig. 7) come within the sides 13 of the slab or beam form and lie over the thickened edge portions of the slab or beam which is made and serve, in the operation of the machine, to force and compress the cementitious material at the thickened longitudinal edges of the beam.

A horizontal shaft 52 extends between and through said arms 48 between their ends. A vertical tamper is connected with the rod or shaft 52. It has two vertically positioned end members 53 which, at their lower ends, are connected by horizontal tamping bar 54 having a stepped under surface as shown in Fig. 6. The upper end portions of the vertical ends 53 of the tamper element extend into a housing on the carriage frame made by two transverse sides 55 and a cover 56 of sheet metal, the sides 37 of the carriage being extended vertically in an upward direction to close the ends of said housing and to provide bearings for a shaft 57 which is belt driven by the electric motor 41. The shaft 57 carries eccentrics 58 within eccentric housings at the upper ends of the tamper end members 53.

On driving the shaft 57 the tamper member is rapidly reciprocated in a vertical direction, being continuously alternately raised and lowered, as is evident. The raising and lowering of the tamper element likewise raises and lowers the shaft or rod 52, thereby rocking the bell crank ends of the troweling member about the axis of the shaft 45 and correspondingly raising and lowering the pressure feet 51. The rocking of the arms 46 causes the bar 47 to be swung back and forth through a short arc around the axis of the shaft 45 as a center. The tamper bar 54 is raised and lowered a predetermined distance and the tamping and pressing foot members 51 are raised and lowered a greater distance because positioned out farther from the axis of the shaft 45.

In the operation, with the entire machine having its several parts as in Fig. 1, through a control of the motor circuits which will hereafter be described, the tamping and troweling machine followed by the material delivery or depositing machine is moved by being driven by the motors 40 and 27 to the right, traversing the several track sections 5, 14, those on the bridge 15, and those at 10, until the tamping and troweling machine is positioned at the other end of the tracks. During such movement with the motor 30 operating to continuously deliver the cementitious material from the hopper into the receiving form therefor, a lower stratum of the material will be supplied. It is of course to be understood that during such movement the belt 28 will be operated in a direction opposite to that shown in Fig. 4, and the delivery of the material to the form will be at the opposite end of the belt from that shown. When the tamping and troweling machine has reached its end of travel, the form will have been traveled its full length and the lower stratum of material deposited therein.

During such deposit or delivery of the material for the lower stratum, the tamping and troweling elements need not be operated, as they would be ineffective if operated, therefore, the motor at 41 may be at rest. On the return or back to initial position, the motor 30 is reversed in its turning so as to deliver the upper stratum of cementitious material in a ribbon, as at 35 (Fig. 4), after the reinforcement 36 has been put in place. Immediately following behind, driven in reverse by a reversal of the motor 40, the cementitious material which has been deposited is tamped and forced downwardly by the tamping feet 51, and the bar 54, reaching a predetermined level and providing an upper flat surface which is troweled by the alternate arcuate movements of the bar 47 rounded at its under side, which serves to level and smooth the completed beam at its upper side. When the depositing and tamping and troweling machines reach the position from which they initially started, that shown in Fig. 1, the motors are stopped and the piston-cylinder apparatus at 20a actuated to lower the sides 13 of the form. The pallet 22, with the completed beam or slab there above is lifted out of the machine by a suitable truck which may be equipped with arms to pass between the transverse sills 21 underneath the pallet to lift the completed beam and its under pallet and move it away from the machine for deposit at a place where it may subsequently harden and set. A succeeding pallet is put in place, the form sides 13 returned to upper position and the cycle of operations repeated to produce the succeeding beam.

In Fig. 9, a diagrammatic representation of the electric controls is shown. The three wires leading to each of the motors 27 and 30 on the cementitious material delivering machine are joined in a cable 59 which is wound and unwound from a reel 60 in the traveling movements of such machine. Similarly, the three wires to each of the motors 40 and 41 of the tamping and troweling machine are in a cable 61 wound and unwound from a reel 62. The usual connecting boxes 63 and 64 may be used for the connections of the wires. Each of the three wires for each of the motors is connected in accordance with old practice with a relay 65 interposed in them, and said three wires are all connected with a return wire 70 to the relay, independently of each other and with interposed switches 67, 68 and 69. When the switch 67 is closed the motor controlled by the three wire circuit in question is at rest. The switches 68 and 69 are reversing switches, the motor running in one direction when one is closed and in the other direction when the other is closed. There will be three duplicates of the diagrammatic representation shown, one for each of the motors. As electric controls of the nature illustrated are not new and do not form a novel structural part of the present invention, though used in its operation, it is not more specifically detailed as those skilled in the art are familiar with such controls and may readily produce them.

With the invention shown and described, the rapid production of beams or slabs of cementitious material, generally using a suitable aggregate and Portland cement as a binder, may be rapidly and economically produced in large quantities. The dimensions of the beam or slab produced, of course, will depend upon the length of the pallet and its width and shape, with, of course, a cooperating width of material depositing and tamping and troweling mechanisms. With each complete movement of the machines from initial starting position back to said position, a beam, as illustrated in the drawings, is produced in finished complete form, except for its subsequent setting. The tamping feet at 51 may be used at the proper places where there is greater thickness of cementitious material to be tamped and compressed. The troweling and smoothing of the upper exposed surface of the article produced follows instantly the tamping and compressing of the material. At all other surfaces the sides and edges of the beam produced are in conformity with the surfaces of the pallet and of the side members 13 of the form against which the material is forced. The mechanism described has proved very practical and useful and very efficient for the purposes for which designed. The stepped lower side of the tamping bar 54 greatly facilitates the proper tamping to get uniformity of density and strength.

The invention is defined in the appended claims and is to be considered comprehensive of all forms of structure coming within their scope.

I claim:

1. An apparatus of the type described, a horizontally located bottom pallet, supporting means therefor, vertically positioned side members, one at each longitudinal side edge of the pallet disconnected therefrom, means for mounting said side members on the supporting means for movement thereof into an upper operative position at the side edges of the pallet and to a lower inoperative position wherein said side members are located below said pallet, means for operating said side member moving means to selectively locate said side members at either of said positions, said side members, at the upper longitudinal edges thereof, having track sections the length thereof over which material depositing and material compressing and smoothing apparatus are adapted to be moved, and a second supporting means located at one end of and beyond said side members and pallet, having similar tracks alined with the tracks on said side members when they are in their upper position, said second supporting means having a length such that the material depositing and material compressing and smoothing apparatus may be located wholly thereabove.

2. In an apparatus of the class described, spaced longitudinal vertical supports, spaced transverse sills connected to and extending therebetween and above their upper edges, a bottom pallet carried by and above said sills extending the length of said supports, posts mounted at their lower ends for rocking movement about horizontal axes on said supports extending thereabove, said posts being spaced from each other, two form side members, one located in a vertical plane lengthwise of and at each longitudinal edge of said bottom pallet, means pivotally connecting said form side members to the posts at the upper ends thereof, whereby said form side members may be lifted to an upper position located one at each longitudinal edge of said pallet, or lowered to a lower position below the lower side of the pallet on rocking said posts about their axis of movement, and means for rocking said posts.

3. A structure as defined in claim 2, and a supporting structure at one end of said first mentioned supports, spaced track sections carried thereby at the upper side thereof, spaced tracks carried thereby, tracks connected at the upper edges of said form side members located in alinement with said first mentioned tracks when said form side members are in upper position, a second supporting structure located at and spaced from the opposite end of the first mentioned supports, spaced track sections at the upper side thereof in the same plane and in alinement with said track sections on the form side members when in upper position, and a bridge having spaced track sections at its upper side bridging the space between said form side members and the second supporting structure, the track sections carried thereby alining with the tracks on said second supporting structure and on said form side members when the latter are in uppermost position.

4. In an apparatus as described, spaced vertical side supports, transverse sills connected with said supports and located above their upper edges, a bottom pallet carried on and above said sills lengthwise of the side supports, longitudinal form side members disposed one at each of the longitudinal side edges of said pallet, means for mounting said form side members on said side supports for movement between an upper position and a lower position in which latter position said form members are below the pallet, and in the first position, with said pallet providing a material receiving form, a track secured at the upper longitudnal edge of each of said form side members, a fixed supporting structure at one end of the first supports, spaced tracks thereon at its upper side alining with the tracks on the form side members when the latter are in upper position, an additional supporting structure spaced from the other ends of the first mentioned supports, spaced tracks thereon in the same plane with the tracks on said form supports when the latter are in upper position, a bridge between said last mentioned supporting structure and the adjacent ends of said form side members, and spaced tracks at the upper side of the bridge in alinement with and substantially abutting at their ends with the tracks on said form side members and said last mentioned supporting structure.

5. A construction as defined in claim 1, means for pivotally connecting said bridge to said last mentioned supporting structure to turn about a horizontal axis, and means for simultaneously tilting the bridge upwardly about said axis upon moving said side form members to their lower position.

6. In apparatus of the class described, an elongated form including a horizontal bottom and vertical side members movably mounted one at each longitudinal edge of the bottom, means for raising and lowering said side members to operative and inoperative positions, cementitious material depoisting means movable upon said side members lengthwise thereof and bearing against the upper edges of the side members when they are in upper position, means for driving said material depositing mechanism in movements from one end of the form to the other, thence back and beyond the first mentioned end of the form, and supporting means for said material depositing mechanism located beyond said end of the form onto which said material depositing mechanism is moved after a completion of a cycle of movements thereof from said end of the form to the other and back.

7. In a structure as defined in claim 6, a cementitious tamping and troweling mechanism movably mounted for movements over said form, riding upon the upper longitudinal edges of the side members thereof, located ahead of the material depositing mechanism and moving ahead thereof in the first movement of said depositing mechanism over said form and following behind it on the return movement, said supporting means for the material depositing machine being of a size to receive both mechanisms at the end of the cycle of movements, means for driving said tamping and trowelling mechanism in its movements, and a second supporting means at the opposite ends of the form upon which said tamping and troweling mechanism is carried upon reaching the end of the first movement of said mechanisms over the form.

8. In an apparatus of the class described, an elongated form having horizontal bottom and longitudinal vertical side members movable to operative and inoperative positions, in the former of which said side members extend above the bottom, a cementitious material depositing machine, including a wheeled carriage and a material holding hopper mounted for movements lengthwise of the form, said carriage having wheels bearing upon the upper edges of the side members of said form, means for driving said carraige from one end of the form to the other and back again, and continuously driven means incorporated in said material depositing machine for continuously delivering cementitious material from said hopper into said form during the movements of the machine back and forth thereover.

9. A construction as defined in claim 8, and supported tracks located in alinement with side members of said form and having upper sides flush with the upper edges thereof when said side members are in their upper operative position, onto which said material depositing machine is moved at the end of a cycle of its movements for supporting and carrying said machine when the form side members are lowered.

10. In a machine of the class described, a cementitious material receiving form, including a bottom and spaced movable sides vertically positioned at opposite side edges thereof, means for movably mounting said sides for movement to an upper position in which they extend partly above the bottom of the form and to a lower position in which they are entirely below the bottom of said form, a cementitious material depositing machine, a support therefor at one end of said form, including tracks carrying the machine, the upper sides of which are flush with the upper edges of said form sides when said sides are in upper operative position, said machine being movable from said tracks onto said form side members, means for driving said material depositing machine for movement lengthwise of the form from one end to the other and back to and over said supporting means, and means included in said depositing machine for continuously delivering cementitious material into said form in an initial stratum in the movement of said machine from one end to the other of the form, and a second stratum on the return of said machine to its starting position.

11. Apparatus as defined in claim 10, and a material tamping and troweling machine mounted for movement ahead of the material depositing machine in the first movement of said depositing machine over the form, and following behind it on return movement and onto said support for the depositing machine, a second supporting member at the other end of the form, including tracks onto which the tamping and troweling machine is moved at the end of the first movement over the form, and driven means carried by said tamping and troweling machine for tamping and compressing the cementitious material deposited in the form and for smoothing and troweling said material at its upper exposed surfaces immediately after its tamping and compressing, said tamping and troweling occurring after deposit of the second stratum of material.

BENJAMIN G. COOPER.

REFERENCES CITED

The following references are of record in the file of this patent:

UNITED STATES PATENTS

| Number | Name | Date |
| --- | --- | --- |
| 820,129 | Rice | May 8, 1906 |
| 1,353,510 | Baumgartl | Sept. 21, 1920 |
| 1,859,878 | Lockwood | May 24, 1932 |
| 2,035,627 | West | Mar. 31, 1936 |
| 2,245,426 | Baker | June 10, 1941 |